United States Patent
Santhanam et al.

(10) Patent No.: US 10,147,242 B2
(45) Date of Patent: Dec. 4, 2018

(54) DISTANCE FIELD COUPLED FITTED DEFORMATION LATTICES FOR SHAPE MODIFICATION

(71) Applicant: Autodesk, Inc., San Rafael, CA (US)

(72) Inventors: Nandakumar Santhanam, Ithaca, NY (US); Gordon Thomas Finnigan, Havard, MA (US); Arpan Biswas, Canton, MI (US)

(73) Assignee: AUTODESK, INC, San Rafael, CA (US)

( * ) Notice: Subject to any disclaimer, the term of this patent is extended or adjusted under 35 U.S.C. 154(b) by 0 days.

(21) Appl. No.: 15/360,659

(22) Filed: Nov. 23, 2016

(65) Prior Publication Data

US 2017/0148228 A1 May 25, 2017

Related U.S. Application Data

(60) Provisional application No. 62/259,807, filed on Nov. 25, 2015.

(51) Int. Cl.
*G06T 15/00* (2011.01)
*G06T 19/20* (2011.01)
(Continued)

(52) U.S. Cl.
CPC ............ *G06T 19/20* (2013.01); *G06F 17/50* (2013.01); *G06F 17/5009* (2013.01);
(Continued)

(58) Field of Classification Search
CPC ....... G06T 19/20; G06T 17/20; G06T 3/0006; G06T 2219/2021; G06T 2219/2016; G06T 2210/12; G06F 17/5009; G06F 2217/08
(Continued)

(56) References Cited

U.S. PATENT DOCUMENTS

| 7,755,623 B2 * | 7/2010 | Rockwood ............. G06T 17/30 345/419 |
| 9,262,859 B2 * | 2/2016 | Rockwood ............. G06F 17/50 |

(Continued)

OTHER PUBLICATIONS

Hua, J., & Qin, H. (Jun. 2003). Free-form deformations via sketching and manipulating scalar fields. In Proceedings of the eighth ACM symposium on Solid modeling and applications (pp. 328-333). ACM.*

Kho, Youngihn, and Michael Garland. "Sketching mesh deformations." Acm siggraph 2007 courses. ACM, 2007.*

MacCracken, R., & Joy, K. I. (Aug. 1996). Free-form deformations with lattices of arbitrary topology. In Proceedings of the 23rd annual conference on Computer graphics and interactive techniques (pp. 181-188). ACM.*

(Continued)

*Primary Examiner* — Phu K Nguyen
(74) *Attorney, Agent, or Firm* — Gates & Cooper LLP

(57) ABSTRACT

A method and system provide the ability to modify a three-dimensional (3D) model in a shape editing system. The 3D model is obtained and faces of the model are selected as features (S). A subset (S') of the model that are fixed are selected. Shape modification operations to be performed are prescribed. A deformation lattice is constructed by setting up a lattice structure with control points. Parametric space (u,v,w) is defined in terms of vertices of the lattice structure. Euclidean space (x,y,z) of the 3D model is mapped to the parametric space (u,v,w). The deformation lattice is evaluated by selecting control points, and either affine transformations are applied directly to the selected control points, or the deformation lattice is deformed based on a discrete fitting problem. The evaluated deformed model is then output.

20 Claims, 7 Drawing Sheets

(51) Int. Cl.
G06T 17/20 (2006.01)
G06F 17/50 (2006.01)
G06T 3/00 (2006.01)

(52) U.S. Cl.
CPC ........ *G06F 17/5086* (2013.01); *G06T 3/0093* (2013.01); *G06T 17/20* (2013.01); *G06F 2217/08* (2013.01); *G06T 2210/12* (2013.01); *G06T 2219/2016* (2013.01); *G06T 2219/2021* (2013.01)

(58) Field of Classification Search
USPC ........................................... 345/418
See application file for complete search history.

(56) References Cited

U.S. PATENT DOCUMENTS 9,323,869 B1 * 4/2016 Kanthasamy ....... G06F 17/5018
9,384,591 B2 * 7/2016 Hurt ..................... G06T 19/00
9,665,667 B1 * 5/2017 Nag ...................... G06F 17/50

OTHER PUBLICATIONS

"Lattices", Autodesk, Inc. wiki Aug. 7, 2015., http://softimage.com/xsidocs/deforms_Lattices.htm.
GoSculptor. http://gosculptor.com/, 2012.
Screenshot of Bi-Directional Associativity Between SapceClaim and ANSYS, https://www.youtube.com/watch?v=Y5w21mVfCWk, Oct. 10, 2012.
Shah, J. J., et al., "Advances in feature based manufacturing", Elsevier, 2013.
"Direct Modeling", Autodesk Fusion 360, Sep. 22, 2017. https://knowledge.autodesk.com/support/fusion-360/getting-started/caas/CloudHelp/cloudhelp/ENU/Fusion-GetStarted/files/GUID-DCC3B4DD-8853-40E5-AA33-1839092C99BF-htm.html.
"SpaceClaim", Wikipedia The Free Encyclopedia, last edited Nov. 2, 2016. https://en.wikipedia.com/wiki/SpaceClaim.
Brujic, D., et al., "Measurement-based modification of nurbs surfaces", Computer-Aided Design, 34(3):173-183, 2002.
Biswas, A., et al., "Heterogeneous material modeling with distance fields", Computer Aided Geometric Design, 21(3):215-242, 2004.
Coquillart, S., "Extended free-form deformation: a sculpturing tool for 3D geometric modeling", vol. 24. ACM, 1990.
Eck, M., et al., "Multiresolution analysis of arbitrary meshes", In Proceedings of the 22nd annual conference on Computer graphics and interactive techniques, pp. 173{182. ACM, 1995.
Fu, L., et al., "Feature, design intention and constraint preservation for direct modeling of 3d freeform surfaces", 3D Research, 3(2):1-18, 2012.
Hsu, W. M., et al., "Direct manipulation of free-form deformations", In ACM Siggraph Computer Graphics, vol. 26, pp. 177-184. ACM, 1992.
Kent, J. R., et al., "Shape transformation for polyhedral objects", In ACM SIGGRAPH Computer Graphics, vol. 26, pp. 47-54. ACM, 1992.
Piegl, L., et al., The NURBS book. Springer Science & Business Media, 2012.
Samareh, J., "A survey of shape parameterization techniques", In NASA Conference Publication, pp. 333-344. Citeseer, 1999.
Sederberg, T. W., et al., "Free-form deformation of solid geometric models", In ACM SIGGRAPH computer graphics, vol. 20, pp. 151-160. ACM, 1986.
Shapiro, V., et al., "What is a parametric family of solids?", In Proceedings of the third ACM symposium on Solid modeling and applications, pp. 43-54. ACM, 1995.
Song., W., et al., "Free-form deformation with weighted t-spline", The Visual Computer, 21(3):139-151, 2005.

* cited by examiner

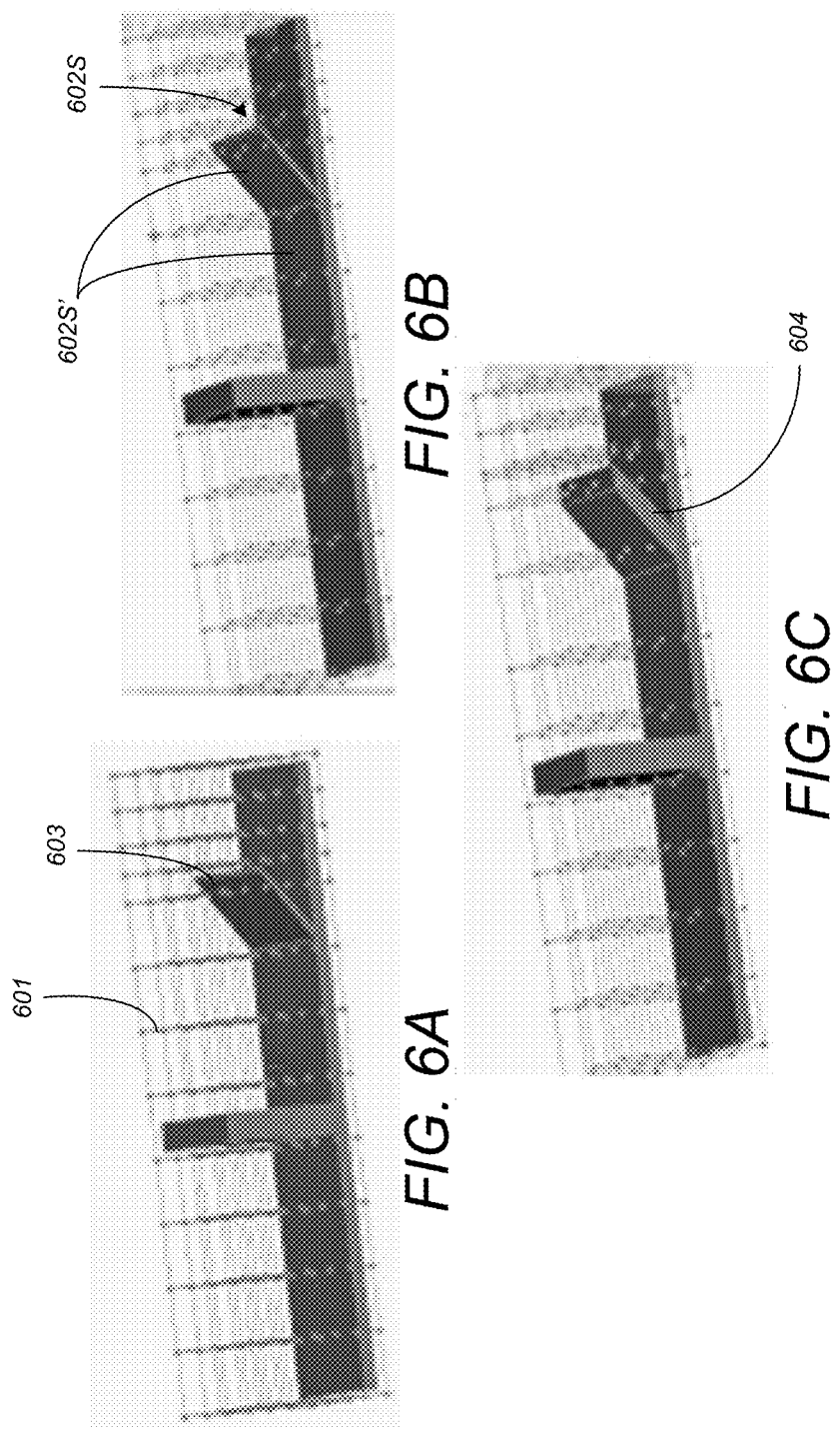

DISTANCE FIELD COUPLED FITTED DEFORMATION LATTICES FOR SHAPE MODIFICATION

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/259,807, filed on Nov. 25, 2015, with inventor(s) Nandakumar Santhanam, Gordon Thomas Finnigan, and Arpan Biswas, entitled "DISTANCE FIELD COUPLED FITTED DEFORMATION LATTICES FOR SHAPE MODIFICATION,".

BACKGROUND OF THE INVENTION

1. Field of the Invention

The present invention relates generally to computer-aided design (CAD) and simulation, and in particular, to a method, apparatus, and article of manufacture for modifying modeling shapes in a simulation product using deformation lattices without utilizing the originating CAD system.

2. Description of the Related Art (Note: This application references a number of different publications as indicated throughout the specification by reference characters and numbers enclosed in brackets, e.g., [xyy92]. A list of these different publications ordered according to these reference characters and numbers can be found below in the section entitled "References." Each of these publications is incorporated by reference herein.)

In today's world of design, engineering and manufacturing, it is extremely commonplace to use a model originally created in one CAD system in a different CAD or CAE (computer-aided engineering) tool, e.g., to perform a structural or fluids simulation. It is important to have the ability to make changes to the model in the non-native tool in order to estimate the effect of these changes in engineering outcomes such as stiffness, strength, thermal management, etc., and also to make these changes parametrically in order to explore the design space via optimization or design of experiments (DOE). However, there is no standardization in the core "data model" used in authoring CAD systems, which causes imported data to appear in the destination system as "dumb geometry" or a boundary representation (BREP) that is stripped of all the rich design intent expressed in the authoring tool, e.g., the "feature tree", which represents a parametric recipe for the construction of the model. This means that the destination tool has no real means to effect geometric changes in a facile manner that would be equivalent to making these changes in the authoring CAD system. Several approaches have been attempted to remedy this problem as listed below, but none of these represent an effective solution to the problem of modifying non-native CAD geometry.

Feature Recognition

An approach to remedy the problem is that of automatic feature recognition. Automatic feature recognition attempts to recognize "features" in the imported BREP [SMN13] based on many approaches including topological, heuristic, volumetric, process-centric, and hybrid approaches. However, it has been recognized over the years that this is a very challenging problem and none of the approaches work at a level of robustness or reliability that is required to extract features from complex, industrial geometry, especially for the purposes of design edits. Hence, it remains as an open problem in the field of CAD and Computational Geometry.

Hosted Editing in the Authoring CAD System

Another approach is that of hosted editing in the authoring CAD system. This approach is used in some CAE systems, typically referred to as "bi-directional associativity". This approach requires the authoring CAD system to be co-installed with the destination CAE or CAD tool. Changes are made in the authoring CAD tool and communicated seamlessly into the destination CAE/CAD system. Note that the destination system still views the imported model as "dumb" geometry—the key aspect of the feature is typically the automatic update of data that was created in the destination system that is associated with the original geometry. This approach, while robust, has several drawbacks. Firstly, it requires the authoring CAD system to be available on the same machine as the destination CAE or CAD tool. This is not possible in several contexts, e.g., when an analyst receives a model from a designer and will perform simulations on a system that has no access to the authoring CAD tool. Secondly, this approach is not really viable for optimization type workflows that require model changes to occur on the back-end server system that may have no access to the CAD UI (user interface) at all. Lastly, this approach is restricted to interchange of CAD data in the original authoring format—it cannot be done if the data is received as a neutral file such as STEP/IGES (standard for the exchange of produce model data/initial graphics exchange specification), which is a very common workflow in engineering design.

Direct Modeling

Direct Modeling is a relatively recent feature available in several CAD systems that allows geometry of "dumb" CAD to be edited directly using operations such as pushing/pulling of faces, deletion, etc. This approach does serve to edit CAD models outside the context of their authoring CAD systems. However, these direct modeling operations require significant levels of modification of the geometry/topology of the concerned entities, in addition to recognition of features such as blends. Consequently, the reliability of these operations tend to be far less than ideal when dealing with complex industrial geometry or operations that involve modifications that are extremely complex, e.g., increasing the thickness of a shelled model that has a complex outer surface and a significant amount of detail in its core.

Deformation Lattices

Deformation lattices have been used as free-form deformation tools since their introduction [SP86], primarily in the context of geometry edit tools like those used in animation and, more recently, in Simulation and Optimization. This approach is geared towards free-flowing edits of CAD and mesh data. However, this approach falters substantially in the editing of engineering geometry in a manner equivalent to parametric editing or driving geometry via parametric changes specified via the BREP itself rather than on the deforming lattice. Additionally, this approach is cumbersome for making changes such as modifying the thickness of thin geometry like ribs and fine features and not viable for changes that are complex, e.g., moving a sculpted face so that every point on the face will move outward by a specified distance in a direction normal to the face at that point. Consequently, this approach has limited applicability in the editing of engineering geometry in a manner that would be relevant to effecting design changes or driving optimization.

Prior Art Summary

In view of the above, in computer aided design and simulation, the modification of shapes is an essential modeling process. In commercial CAD systems, models are constructed and represented with features. Examples of such features are holes, slots, and bosses. CAD models are constructed with Boolean operations among these features. Shapes are parameterized with dimensions of such features and their relative locations. Shapes in these CAD systems are modified by changing these parameters. Definitions of these features and the parameters are only relevant within a given CAD system. CAD models can be imported in other CAD systems or simulation software only as "dumb geometry" or boundary representations (B-Reps). Establishing straightforward relations between B-Reps and design parameters is usually difficult as this typically requires solving a system of equations [SV95, FKS12]. The other possible approach is to extract features based from imported B-reps [SMN13]. Such a feature based approach has a number of limitations. First of all, even after efforts for several decades, no commercially available software can extract features reliably and automatically, especially for models with a moderate or high degree of complexity. Secondly, the derived features may not be the ones needed to effect the shape change that is desired.

In recent years, "direct editing" of CAD models has become more prevalent with modeling tools/applications such as the AUTODESK FUSION 360 application or SPACECLAIM application. These tools/applications modify the geometry by operating directly on the BREP without requiring parametric information. However, the geometry changes available with such tools are relatively limited since they generally require an extensive sequence of operations that involve topology and geometry that are relatively complex in nature with a substantial risk of failure. In addition, complex changes are not easily expressed in these direct edit tools—an example would be thickening the outer boundary of a shelled body that has subsequently been modified to include a lot of interior details.

Furthermore, shapes may be obtained from various other techniques such as topology optimization. In topology optimization, optimized material distribution is obtained that can suggest an optimal layout. Shapes that are an outcome from these techniques can be "organic" in nature and are not expressible as a Boolean of parametrized geometry primitives as is typical in solid modeling. Modification of such shapes and optimizing them with a view of achieving the best design is not currently possible without recreating these shapes "from the ground up" using roughly equivalent parametric geometry.

Various prior art approaches have been unsuccessfully used to solve the above-identified problems. One prior art approach makes the design changes in the host CAD system and then passes such changes back to the simulation application. However, such a process is generally very inefficient since the simulation engineer is normally unfamiliar with the host CAD application. In addition, such an approach still fails to allow functions such as parametric optimization for design of experiments (DOE) that require shape changes to be executed. In a second prior art approach, some prior art simulation products have required the CAD system to be co-installed and in effect shape changes via the CAD API (application programming interface) in the external CAD process. Though this works, such a process is a substantial burden on the simulation engineer. In a third prior art approach, changes were made by altering the mesh directly. Note that none of these prior art approaches work for "organic geometry" produced by processes such as topology optimization.

In view of the above, what is needed is a mechanism for modifying shapes and parametrically modifying dumb geometry in a simulation that avoids the problems described above.

SUMMARY OF THE INVENTION

Embodiments of the invention use deformation lattices to effect changes to geometry. In addition, embodiments of the invention incorporate the concept of constraints implemented by the use of 'falloff' functions based on distance fields that allows thickness changes to thin parts. Furthermore, embodiments of the invention implement surface aligned shape changes (e.g., thickening a thin curved part by pulling one face in its normal direction) with minimal user intervention using the concept of 'fitted displacements' imposed on deformation lattices coupled with constraints based on distance field falloff functions. Embodiments of the invention use the concept of parameter style changes that allow the user to specify a parametric change and derive a set of deformation lattice movements to produce this change. Lastly, embodiments of the invention ensure the validity of shape changes by constraining the motion of the deformation lattice using a novel "spring network" approach based on structural mechanics.

In other words, embodiments of the invention solve the issue of "dumb geometry" modifications in CAD and simulation. The concept of deformation lattices is combined with distance-field based constraints, fitted (derived) deformations to produce shape aligned deformations, and parameter-style changes on dumb geometry in addition to parameter-style changes to organic geometry from topology optimization.

More specifically, embodiments of the invention provide:

(a) an application of distance-field based functions to deformation lattices to create a constraint system that allows performance of precise modeling operations using deformation lattices;

(b) use of a fitting (or reverse engineering) process to obtain desired displacements of a parametrically specified modeling edit operation. This allows the construction of parametric modeling operations without the user having to interact directly with deformation lattices; and (c) application of a spring-based energy minimization functional on the deformation lattice to obtain always legal deformations in order to obtain valid model configurations after the deformation.

BRIEF DESCRIPTION OF THE DRAWINGS

Referring now to the drawings in which like reference numbers represent corresponding parts throughout:

FIGS. 6A-6C illustrate an inclined rib that was thickened by moving the right face further to the right with a significant number of fewer control points in accordance with one or more embodiments of the invention.

DETAILED DESCRIPTION OF THE PREFERRED EMBODIMENTS

Figure 1:
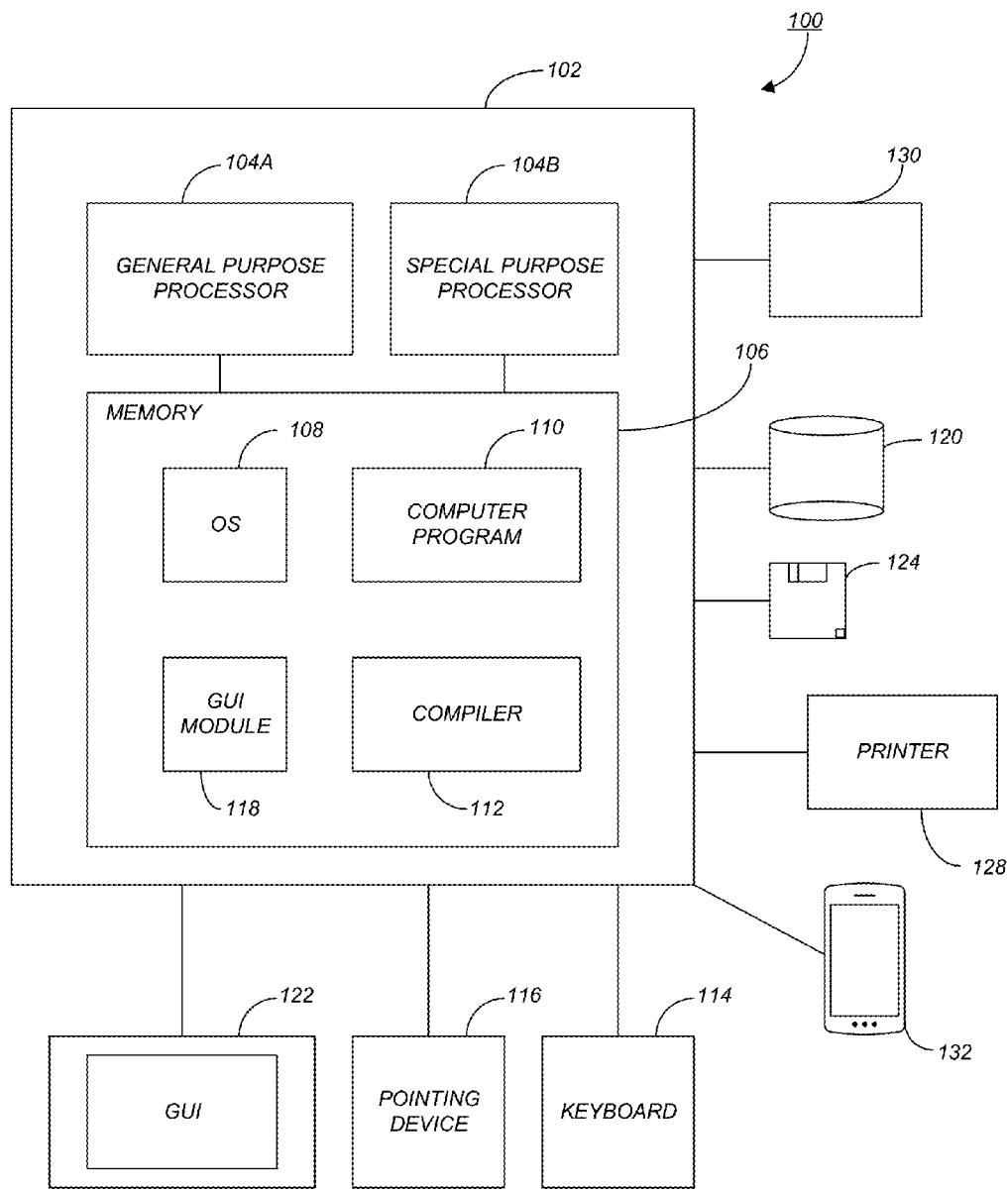
FIG. 1 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a framework and a tool to effect shape changes and parametrized edits to "dumb geometry" by effectively making them "smarter". In addition to BREPs from CAD systems, a tool in accordance with embodiments of the invention can be applied to "loose surfaces" or discretized geometry such as surface or volume meshes. Using such a tool, the designer can make complex changes to geometry without requiring the source CAD system. In addition, an engineer or analyst can make parametric changes to dumb geometry without needing access to the authoring CAD tool.

Some of the components that are unique contributions are detailed below:

1. A shape editing system where users can effect modifications or make parameterized edits by specifying S which can be a face, a collection of faces, or region of the boundary and by specifying size, location, and other shape controlling parameters. As used herein, S will also be referred to as features. Characteristics of the system are listed below.

The user can select a face, a set of faces, or any arbitrary region of the model as S;

The user can specify modifications by indicating parameters corresponding to changes in size, location or other parameters;

The system determines a set of internal entities S' that need to be constrained in order to effect the required change. Alternatively, the user can also specify regions in the geometry that should be constrained. Also, note that this can be done in a "complementary" manner, i.e., the internal mechanism or user specification may be set of entities that are allowed to be deformed while keeping all the other entities fixed; and The system will make the shape changes, achieving the set of changes the user desires while retaining a level of smoothness and continuity needed to ensure that the resultant geometry is valid and better suited to downstream applications.

2. A distance-field based constraint system is used to ensure that there is no motion on the set of entities S' that belong to the model Q. Alternatively, only the entities in S are allowed to deform and all entities are held fixed. This allows the user to make changes, e.g., to thicknesses in thin areas such as thin ribs without requiring the construction of a lattice that is extremely dense locally.

3. A "fitting" mechanism produces the shape change the user requires using an "inverse" approach. Using this approach, the user specifies the changes he requires in a direct manner, including parametric ones. The system computes the deformation that is required of the deformation lattice in order to effect this change by solving a fitting or minimization problem.

4. In order to ensure model validity, a system of structural components is modeled and the resultant structural equation that guarantees the validity and non-self-intersection in the geometry and the underlying deformation lattice is solved.

Once an appropriate model/modeling operation has been obtained/acquired/performed, embodiments of the invention provide the ability to output such a model/modeling operation (e.g., to a display device, for further processing, to a 3D printer, etc.).

Hardware Environment

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD, NOOK, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as C, C++, Assembly, SQL, PYTHON, PROLOG, MATLAB, RUBY, RAILS, HASKELL, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
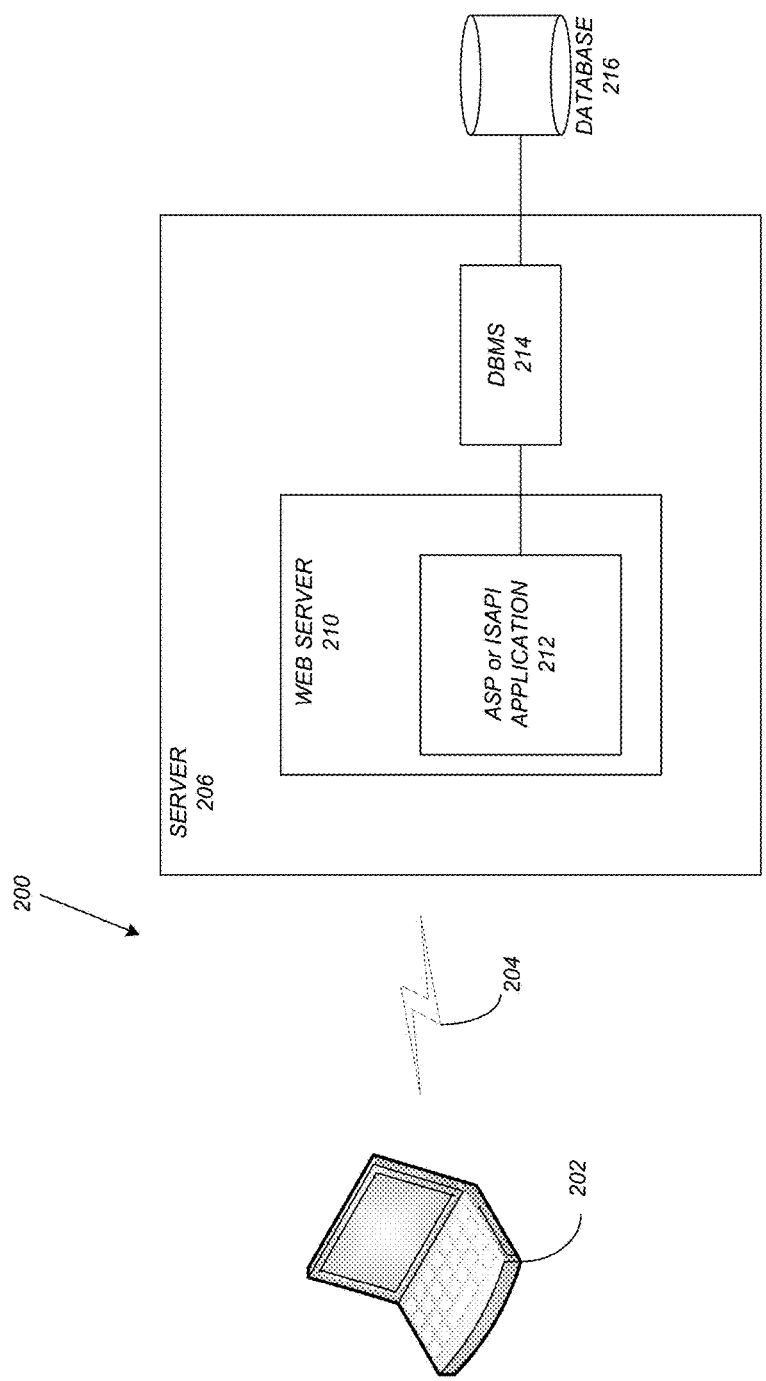
FIG. 2 schematically illustrates a typical distributed/cloud-based computer system using a network to connect client computers to server computers in accordance with one or more embodiments of the invention.

FIG. 2 schematically illustrates a typical distributed/cloud-based computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Further, in a cloud-based computing system, resources (e.g., storage, processors, applications, memory, infrastructure, etc.) in clients 202 and server computers 206 may be shared by clients 202, server computers 206, and users across one or more networks. Resources may be shared by multiple users and can be dynamically reallocated per demand. In this regard, cloud computing may be referred to as a model for enabling access to a shared pool of configurable computing resources.

Clients 202 may execute a client application or web browser and communicate with server computers 206 executing web servers 210. Such a web browser is typically a program such as MICROSOFT INTERNET EXPLORER, MOZILLA FIREFOX, OPERA, APPLE SAFARI, GOOGLE CHROME, etc. Further, the software executing on clients 202 may be downloaded from server computer 206 to client computers 202 and installed as a plug-in or ACTIVEX control of a web browser. Accordingly, clients 202 may utilize ACTIVEX components/component object model (COM) or distributed COM (DCOM) components to provide a user interface on a display of client 202. The web server 210 is typically a program such as MICROSOFT'S INTERNET INFORMATION SERVER.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S TRANSACTION SERVER (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Embodiments of the invention are implemented as a software application on a client 202 or server computer 206. Further, as described above, the client 202 or server computer 206 may comprise a thin client device or a portable device that has a multi-touch-based display. Further to the above, in accordance with embodiments of the invention, a CAD application, simulation application, shape modification system, etc. may be implemented in client 202 and/or server 206.

Shape Modification System

Deformation lattices have been widely employed as a tool for free-form deformation since its introduction in [SP86]. In embodiments of the invention, a volumetric parametric space (u,v,w) is defined at volume V, which is embedded in the space as the model (Q). Deformation field u(p) is constructed with volumetric Bezier basis functions $\psi_i(u), \psi_j(v)$ and $\psi_k(w)$. The model Q is modified by changing the positions of control points of a Bezier volume specified in lattice form at V. In [HHK92, Coq90], the concept has been generalized with a lattice constructed to B-spline basis functions and subsequently to T-splines [SY05], which generalizes concepts of B-splines. Although T-splines are constructed with a similar type of basis function as B-splines, in a T-spline, lattices can be refined locally to capture finer control with a deformation lattice.

Formulation

Deformation fields are constructed as $p(1-W(p))+W(p)u(p)$, where p is the position vector of the point P, u(p) is constructed with a B-spline or T-spline based deformation lattice and weight W(p) is constructed with distance fields of S and S'. With W(p), additional constraints are introduced on the deformation fields. Such constraints include zero deformation at S' and a rate of deformation with the distance from S. W(p) is constructed with distance fields of S and S' as described in further detail below.

u(p) is constructed with a volumetric B-spline or T-spline of basis functions $\psi_i(u), \psi_j(v)$ and $\psi_k(w)$. Each point P (x, y, z) in V is assigned a parameter value (u, v, w) by establishing a map between the embedded space of V and the parametric space of a deformation lattice. The displacement field u(p) is represented as $$u(p) = \sum_{l=0}^{N} \psi_l(u, v, w) C_l \quad (1)$$

where $\psi(u, v, w) = \psi_i(u)\psi_j(v)\psi_k(w)$ and $C_l := c_{ijk}$ are position vectors of control points of the lattice structure.

Figure 3:
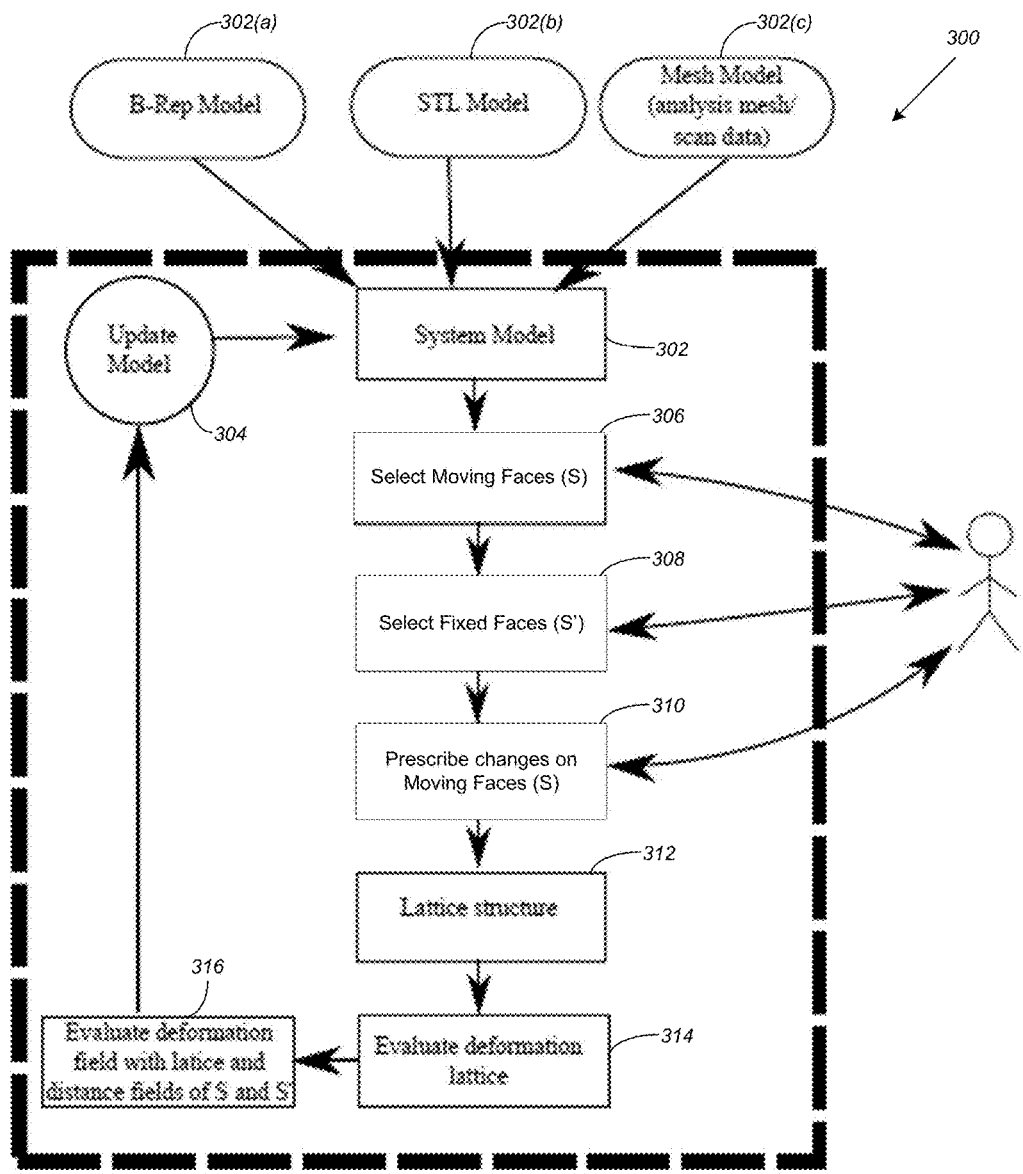
FIG. 3 illustrates a shape editing system diagram showing a flow of models in accordance with one or more embodiments of the invention.

FIG. 3 illustrates a shape editing system diagram showing a flow of models in accordance with one or more embodiments of the invention. In the shape-editing system 300, a system model 302 can be obtained as a result of a model import (e.g., an import of BREP model 302(a), STL Model 302(b) or mesh model (analysis mesh/scan data) 302(c) or a model update 304 after a prior deformation lattice based shape modification operation (see further description below).

Specify/Select (Moving) Faces 306

As part of the specify/select moving faces (S) shape edit operation 306, users specify/select interactively any face or a collection of faces and region or collections of regions of the shape (e.g., that are moving faces). As used herein, a face is defined as a face in a solid model, a collection of polygons in a surface mesh model, or a collection of boundary facets in a solid mesh model.

In CAD, the ability to specify deformations precisely to a certain set of faces may be one of the key requirements. For example, mating surfaces of a part of an assembly are often designed with a high level of precision. Maintaining the same order of accuracy even after applying the prescribed deformations on S will be essential. In other words, it may be desirable to restrict or fix various high precision areas, faces, or regions. In system 300, such faces S' (to be fixed) may be identified automatically. However, users can interactively identify S' and recommend identified changes. Accordingly, users may validate/select fixed faces/regions at step 308 (thereby identifying S').

In addition, users prescribe almost any shape modification operation(s) (e.g., on the set of moving faces S) that are supported in CAD systems (i.e., at step 310). Such shape modification operations include but are not limited to scaling, rotation, translation, and offset (or a combination of these operations).

Lattice Setup

The mapping function between the Euclidean space and the parametric space for a deformation lattice is governed by the construction of a lattice structure at step 312. The desired mapping function will be computationally trivial to evaluate as frequent evaluation of parameter values are often required. In one or more embodiments, the process begins by setting up a lattice structure with uniformly spaced control points at step 312. The interior of the bounding box around the shape is mapped to a parallelepiped parametric space $0<u<1$, $0<v<1$, and $0<w<1$. In the parametric space of the B-spline lattice, knots are only repeated at outer boundaries. For example, with the degree two lattice structure, the knot space is selected as (0, 0, 0, 1, 1, 1) along any parametric axis. From the properties B-splines and Bernstein polynomials, it can be shown that such constriction of the initial lattice structure gives a trivial linear map between (x, y, z)→(u, v, w).

Based on the modeling requirement, additional control points in the lattice structure can be introduced by a well know Oslo method for knot insertion [PT12]. As the formulation in the knot insertion method guarantees invariance of a parametric space, no additional mapping function for (x, y, z)→(u, v, w) is required for subsequent modification of the lattice structure. The same concept knot insertion can be generalized with T-splines starting from the B-spline lattice structure with knots only at boundaries. In the case of T-splines, the lattice structure can be refined locally around S [SY05].

Evaluation of Deformation

Shape Modification With Specified Displacement of Control Points

At step 314, the deformation lattice is evaluated. In mechanical design and simulation, many of the shape modifications involve translating, scaling or rotating features. These transformations are elements of a class of transformation that are known as affine transformations. If any shape modification operation involves affine transformations of S, the displacement field u(p) may be obtained by applying the same transformation directly on the control points around the feature.

A deformation lattice constructed with a B-spline or T-spline basis ensures a localized deformation of volume due to movement of a control point. A control point of a deformation lattice of degree k influences a region [PT12].

$$u_i \leq u < u_{i+k}, v_j \leq v < v_{i+k} \text{ and } w_j \leq w < w_{i+k} \quad (2)$$

in the parametric space. Besides localization, B-splines are affine invariant in the sense that the B-spline volumes can be subjected to various affine transformations by applying such transformations to the control points.

Figures 4A, 4B:
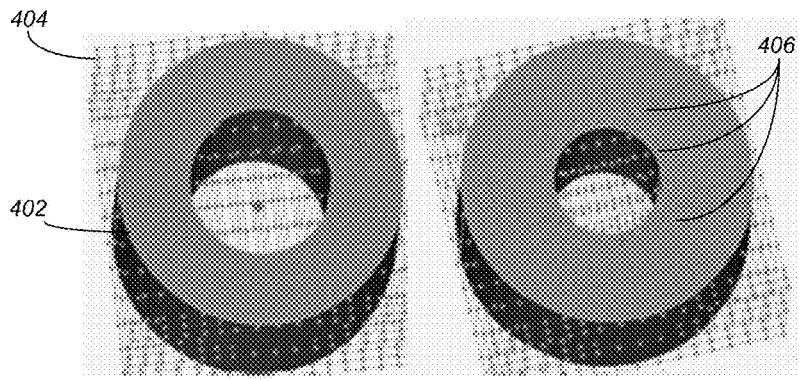
FIGS. 4A and 4B illustrate a reduction in a diameter of a hole by applying an affine transformation to the selected control points in accordance with one or more embodiments of the invention.

With these two properties of B-splines, a deformation field u(p) for applying an affine transformation at S can be constructed by applying the same affine transformation to the control points that have influence at S [PT12]. The relevant control points for applying such transformation can be obtained from Equation 2 above. FIGS. 4A and 4B illustrate a reduction in a diameter of a hole by applying an affine transformation to the selected control points 406 in accordance with one or more embodiments of the invention. In particular, FIG. 4A illustrates an annulus solid 402 with a deformation lattice 404. FIG. 4B illustrates that the inner hole of FIG. 4A has been made narrower by applying scaling to the specifically selected control points 406 that influence the volume covering the inner face.

Construction of Deformation Field With Fitting

At step 316, the deformation field is evaluated with lattice and distance fields of S and S'. All desired design modification cannot be constructed with affine transformations on a collection of faces. For example, the thickening operations require moving each point in the collection faces in normal directions evaluated at each point. Displacements of the control points required to achieve such a deformation are not intuitive. Embodiments of the invention utilize an approximation technique for constructing such a deformation by formulating the problem as a discrete fitting problem.

Thus, if shape modification includes an affine transformation, the affine transformation is applied directly on the selected control points. However, if the shape modification operation does not include an affine transformation, the deformation lattice is deformed based on a discrete fitting problem as described herein.

In formulating a discrete fitting problem, S is sampled at M number of points $P_i$ and displacement $u(p_j)$ at each of these points is evaluated from the prescribed deformation. For the thickening operation, $u(p_i)$ can be evaluated by calculating the normal to the surface at $p_i$ and the prescribed thickness value. New locations of the control points of the deformation lattice are evaluated by minimizing the functional:

$$F(C'_i, \ldots, C'_N) = \sum_{m=1}^{M} |V'(p_m) - V(p_m)|^2$$

where $(C'_i, C'_N)$ are new locations of the control points.

The functional F can be minimized by setting derivatives with respect to $C'_i$ to zero. Arranging the equations in matrix from, we obtain the equation $$A^T A a = A^T b \quad (3)$$

where M×N matrix A is:

$$\begin{bmatrix} \psi_1(u_1, v_1, w_1) & \cdots & \psi_n(u_1, v_1, w_1) \\ \vdots & \ddots & \vdots \\ \psi_1(u_m, v_m, w_m) & \cdots & \psi_n(u_m, v_m, w_m) \end{bmatrix} \quad (4)$$

and $$a = [C'_1 \ldots C'_N]^T$$

$$b = [P_1 \ldots P_M]^T$$

The unknown control points a can be evaluated by solving the equation (3) from displaced positions of all $p_i$ represented in vector form as b. The matrix $A^T A$ is symmetric and usually sparse. The matrix ATA can be ill-conditioned due to the position of S with respect to volume of support for $\psi_i(u, v, w)$. However, by introducing additional constraints such as minimization of control point movements, condition numbers of the system can be improved significantly. A detailed description of such techniques can be found in [BRA02]. With this additional constraint the original minimization problem can be reformulated as $$F(C'_i, \ldots, C'_N) = \sum_{m=1}^{M} |V'(p_m) - V(p_m)|^2 + \beta F_c(C'_i, \ldots, C'_N) \quad (5)$$

As before, functional F can be minimized by setting derivatives with respect to $C'_i$ to zero. With the additional constraint the linear equation 3 can be written as $$(A^T A + \beta I^T I) a = A^T b + \beta a^0 \quad (6)$$

The small constant β will be picked based on the problem. For a wide range of examples, various β values have been tested and acceptable results for this application can be obtained for 0.001≤β≤0.01. Lowering the β, ensures lower influence of $F_c$ at points where the deformation on S was prescribed.

Figures 5A, 5B:
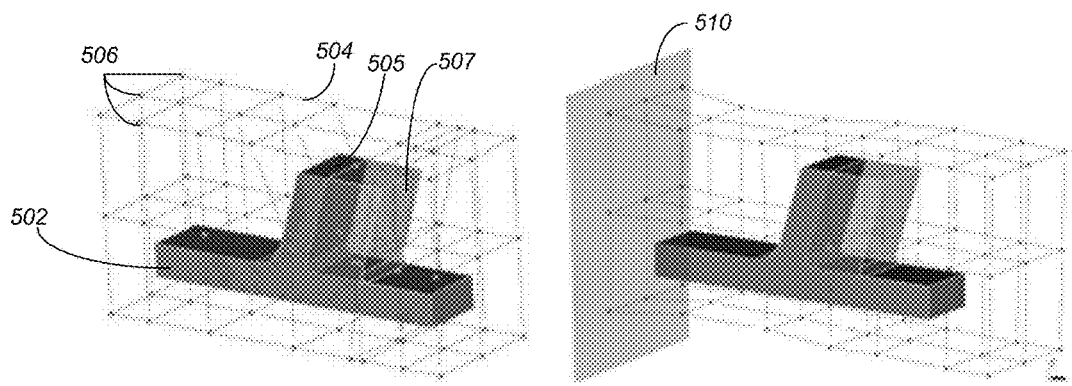
FIGS. 5A-5C illustrate an exemplary use of a displacement lattice to modify a solid model in accordance with one or more embodiments of the invention.
Figure 5C:
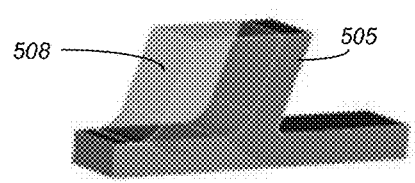

The system of equations can be solved by both iterative and direct solvers. FIGS. 5A-5C illustrate an exemplary use of a displacement lattice to modify a solid model in accordance with one or more embodiments of the invention. FIG. 5A shows an exemplary deformation field constructed by applying translation to the right face and the adjacent fillet by 100 mm displacement along the X axis. Note that as illustrated, the specific deformation is affine—it is simply used as an illustrative example to describe the fitting process; in actuality, affine deformations are handled by directly moving the relevant control points, as described above. A constricted deformation field is weighted with W(p) that was constructed with distance functions as shown in equation 7. More specifically, FIG. 5A illustrates a solid model 502 with a rib, a deformation lattice 504, and the modified solid model 507. In this example, the right face (of solid model 502) and the adjacent fillet are S, and all faces that are not adjacent to S are identified as S'. Further below is a description of the formation for specifying zero deformation at S'.

The prescribed constraint minimizes the displacement of original control points. However, the deformation field constructed with this constraint may introduce a self-intersecting deformation lattice resulting in a loss of differentiability in the deformation field. Notice in FIG. 5A, the deformation lattice 504 is self-intersecting near the right face of the rib 505. Such self-intersection becomes more apparent with the increase in magnitude of the prescribed translation at S. In order to obviate the situation related to self-intersection of a deformation lattice, embodiments of the invention may introduce a constraint $F_c$ in such a way that it minimizes the potential energy of a structural system. In this regard, in FIG. 5A, the introduction of constraint $F_c$ ensures minimum displacement of the original control points 506. For the same model as in FIG. 5A, FIG. 5B illustrates the introduction of $F_c$ that mimics the behavior as a spring system attached between each control point 506 to all of its adjacent control points 506. Lastly, FIG. 5C illustrates a modification of the rib 505 of FIG. 5A by moving the left face to the left by 15 mm (e.g., the modified rib 508). A detailed description of the structural constraint will be introduced below.

Distance Field Based Clamping

With deformation lattices, almost any deformation on Q can be prescribed by introducing additional control points in the lattice structure. However, the number of required additional control points can increase dramatically depending on the shape of the model, prescribed deformation, and desired accuracy. A large number of additional control points will make the representation of the deformed field significantly larger and computationally expensive to evaluate. In addition, selection of control points for affine transformation based deformation will be significantly complicated. In FIGS. 6A-6C, the inclined rib 603 was thickened by moving the right face of the rib 603 by applying translation to the control points enclosing the face. Notice that the deformation lattice 601 should be refined significantly around the inclined face on the right for moving it without modifying the face on the left of the rib 603.

Embodiments of the invention provide a distance-function based technique for constructing deformation with significantly fewer control points to address the situations shown in FIG. 6A. With this technique, a weighting function W(p) is constructed in such a way that W(p) is 1 at the S and 0 at S', the regions where no deformation will be applied. In other words, a weighting function W(p) is constructed that distinguishes between S and S', wherein S' identifies regions where no deformation will be applied. In this example, S includes the face on the right 602S and S' includes the highlighted faces 602S' on the left (e.g., which may appear in a different color/pattern in FIG. 6B). At all other points Q-S-S', W will be in between 0 and 1. Examples of Q-S-S' are faces 604 neighboring to S. Such blending functions can be constructed with Euclidean distance fields of S and S'. A Euclidean distance field Ds(p) in a Euclidean space $E^3$ is a mapping Ds: $E^3 \rightarrow R$ that associates with every point of the space a value equal to the shortest distance to S. Inverse distance weighting functions are widely used in various fields of engineering for interpolating functions prescribed at multiple regions [BST04]. In embodiments of the invention, W(p) is constructed with $D_S^k(p)$ and $D_{S'}^k(p)$ with inverse distance functions. The weighting function W(p) can be constructed with power functions of distances as $D_S^k(p)$ and $D_{S'}^k(p)$ as $$W(p) = \frac{D_{S'}^k(p)}{D_{S'}^k(p) + D_S^k(p)} \quad (7)$$

It is straightforward to verify W(p) is 1 at S and 0 at S' and at all other points 0<W(p)<1. For k≥1, W(p) is smooth up to the order k−1. The influence of a prescribed deformation field can be further modified by prescribing influence function $\lambda(D_S)$ as $$\lambda(D_S) \frac{D_{S'}^k(p)}{D_{S'}^k(p) + D_S^k(p)}.$$

The influence function $\lambda(D_S)$ can be any function which is 1 at S and decreases to 0 with the increase distance $D_S$. For example $\exp(-\gamma D_S)$ can be an example of $\lambda(D_S)$, where γ is a constant.

Accordingly, FIGS. 6A-6C illustrate an inclined rib 603 that was thickened by moving the right face 602S' further to the right with a significant number of fewer control points in accordance with one or more embodiments of the invention. In particular, FIG. 6A illustrates a thin rib 603 with deformation lattice 601. FIG. 6B illustrates selected faces 602S that will be subjected to undesired modification if the face on the right 602S' of the thin face is moved for thickening the rib 603 by moving the control points of the deformation lattice 601. FIG. 6C illustrates that the rib 603 is thickened 604 by moving the selected control points on the right. Notice that no deformation was applied to the selected faces 602 using the distance face based formulation in Equation 7.

Structural Constraint

The concept of structural constraints can be explained by visualizing that the deformation lattice is constructed with a beam structure where each control point and its immediate neighbors are connected by beams along connecting straight edges. Inner control points are connected to eight such neighbors but there are fewer neighbors for control points at boundaries. These beams have stiffness along their lengths, and for an individual beam, the stiffness is equal in both compressive and tensile mode. For simplicity, it may be assumed that no bending or torsional stress is present. In a structural analysis, such systems are called spring structures. Though the concept will be explained with spring structures, it can be easily generalized to any structural formulation. The fitting component introduces deformation in the spring system, and final positions of the points are determined by minimizing the energy of the spring structure. The idea behind minimizing the energy is that in nature, every structural system tries to minimize its energy. Therefore, if the spring structure is subjected to that deformation, at the final configuration of the spring, the energy of the system will be at a minimum. Though wide ranging applications of spring systems can be found in modeling [KCP92, EDD+95], embodiments of the invention apply spring systems with a deformation lattice.

Stiffness Matrix

The energy for the edge between points i and j in a deformation lattice is given by $$e_{i,j} = [(C'_i - C_i) - (C'_j - C_j)]^T \frac{[k]_{i,j}}{2} [(C'_i - C_i) - (C'_j - C_j)] \quad (8)$$

$k_{i,j}$ is the element stiffness matrix. Summing over all the springs gives the total energy of the system.

$$F_c = \sum_{(i,j) \in \text{All edges}} [(C'_i - C_i) - (C'_j - C_j)]^T \frac{[k]_{i,j}}{2} [(C'_i - C_i) - (C'_j - C_j)] \quad (9)$$

In embodiments of the invention, it may be assumed that the spring constants employed to construct $[k_{i,j}]$ are inversely proportional to the Euclidean distance between $C'_i$ and $C'_j$ and trigonometric functions of spatial orientation of the element $C'_i$ and $C'_j$. The global stiffness matrix of the spring system can be obtained by minimizing $F_c$ with respect to $C_i$. If control point $C_i$ is connected $C_j$ and $C_l$ where i, l ∈ [0, n], the i th row of the stiffness matrix is given by:

$$\begin{bmatrix} \cdots & \cdot & \cdots & \cdot & \cdots & \cdot & \cdots \\ \vdots & \vdots & \vdots & \vdots & \vdots & \vdots & \vdots \\ 0 \cdots 0 & -2k_{i,l} & 0 \cdots 0 & -2(k_{i,l} + k_{i,j}) & 0 \cdots 0 & -2k_{i,l} & 0 \cdots 0 \\ \vdots & \vdots & \vdots & \vdots & \vdots & \vdots & \vdots \end{bmatrix} \quad (10)$$

The structural constraint can be introduced for evaluating control points with Equation 5 by specifying Fc as in Equation 9. It is important to observe that the spring system must be sufficiently constrained in order to obtain physically meaningful behavior. For example in FIG. 5B, the left most control points on the plane, which are shown at 510, were fixed. In FIG. 5C, the model was modified by applying −150 mm displacement at the left face and the adjacent fillet to the left along the X axis.

Figure 7:
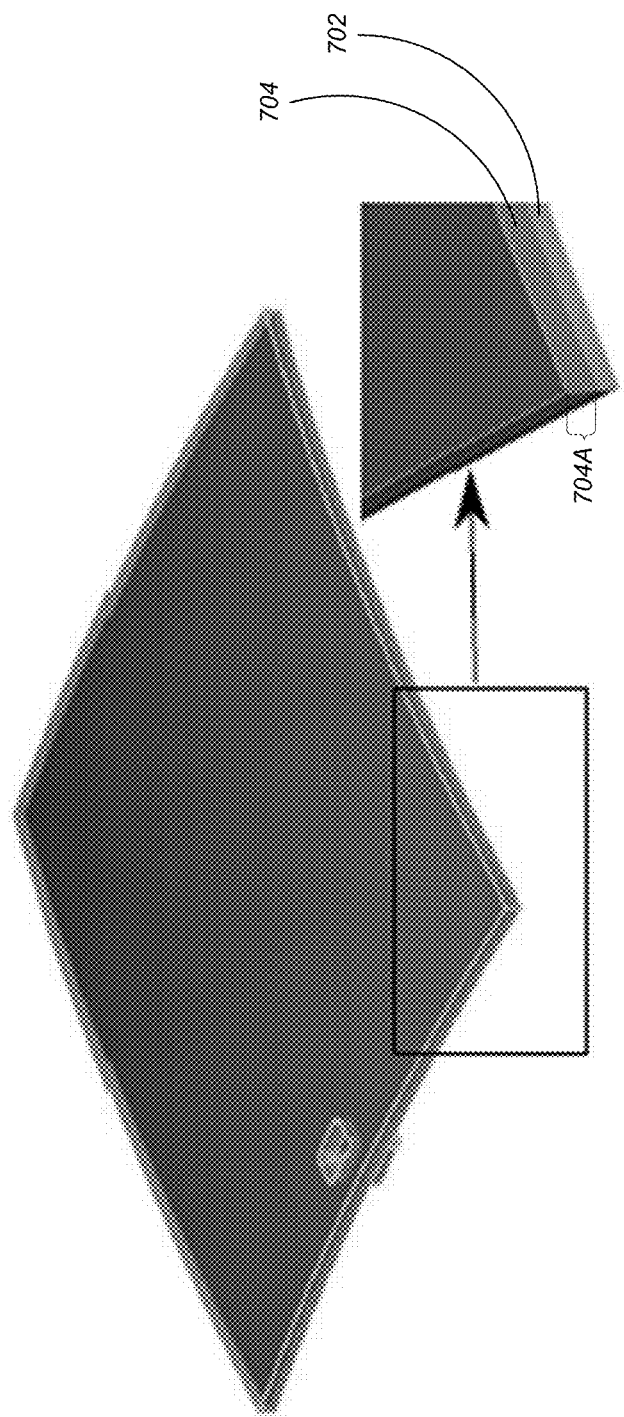
FIG. 7 and FIG. 8 show thickening of models by applying displacements along the normal directions of S and with spring system based constraints in accordance with one or more embodiments of the invention.
Figure 8:
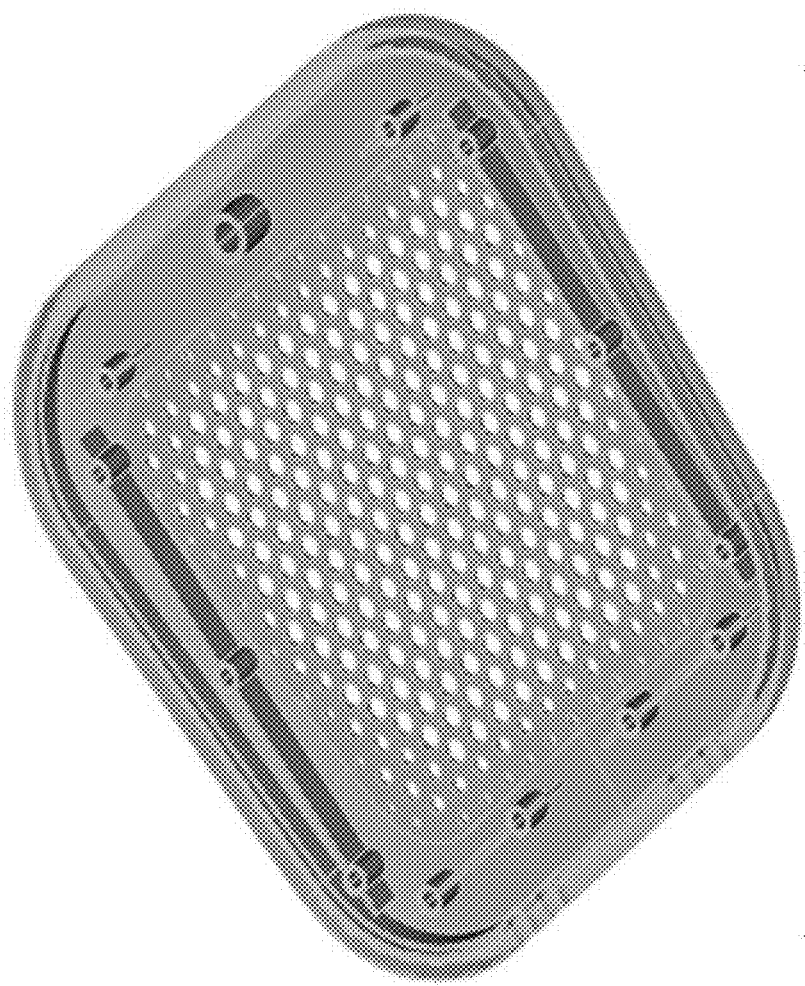

FIG. 7 and FIG. 8 show thickening of models by applying displacements along the normal directions of S and with spring system based constraints. Modified models are shown transparently (e.g., with transparent colors) along with original models in darker shading. In FIG. 7, the plate shaped body 702 is shown, and the modified shape 704 is obtained by thickening the plate shaped body 702 by 2 mm. In this regard, the plate shaped model 702 was thickened by applying displacement on the top surface of the plate (as illustrated by the transparent portion 704A of the modified shape 704). In FIG. 8, the outer faces are displaced in a normal direction to thicken the model. More specifically, FIG. 8 shows a model of a torch cover in a solid and a modified model by moving the outer surfaces by 2.5 mm. In both examples, deformation fields were weighted with a distance fields based weighting function W.

In view of the above, the evaluation 316 of the deformation field/lattice may include a structural constraint (to the deformation lattice). Such a structural constraint is defined by a stiffness along edges connecting two or more of the control points (edges and the connected control points together define a structural system). When the shape modification operation is applied to the lattice, an energy of this structural system is minimized.

One the above steps are performed, the deformed model may be output (e.g., to a display, a printer, transmitted across a network for further processing, etc.).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide at least one or more of the following:
  allows dumb geometry to be modified within design and simulation products to effect shape changes in complex geometries;
  change thicknesses on complex thin parts effectively;
  make changes to doubly-curved or surfaces with substantial curvature to impart thickness changes with minimal user intervention;
  effect 'parametric style' changes to the model without the need for feature recognition or parameter construction on dumb geometry; and
  make parametric style changes to 'organic geometry' that results from a topology optimization. Such geometry is not amenable to shape changes via conventional parameters since they were not constructed parametrically in the first place.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

The following references are incorporated by reference herein:

[BRA02] Djordje Brujic, Mihailo Ristic, and Iain Ainsworth. Measurement-based modification of nurbs surfaces. Computer-Aided Design, 34(3):173-183, 2002.

[BST04] Arpan Biswas, Vadim Shapiro, and Igor Tsukanov. Heterogeneous material modeling with distance fields. Computer Aided Geometric Design, 21(3):215-242, 2004.

[Coq90] Sabine Coquillart. Extended free-form deformation: a sculpturing tool for 3D geometric modeling, volume 24. ACM, 1990.

[EDD+95] Matthias Eck, Tony DeRose, Tom Duchamp, Hugues Hoppe, Michael Lounsbery, and Werner Stuetzle. Multiresolution analysis of arbitrary meshes. In Proceedings of the 22nd annual conference on Computer graphics and interactive techniques, pages 173{182. ACM, 1995.

[FKS12] Luoting Fu, Levent Burak Kara, and Kenji Shimada. Feature, design intention and constraint preservation for direct modeling of 3d freeform surfaces. 3D Research, 3(2):1-18, 2012.

[HHK92] William M Hsu, John F Hughes, and Henry Kaufman. Direct manipulation of free-form deformations. In ACM Siggraph Computer Graphics, volume 26, pages 177-184. ACM, 1992.

[KCP92] James R Kent, Wayne E Carlson, and Richard E Parent. Shape transformation for polyhedral objects. In ACM SIGGRAPH Computer Graphics, volume 26, pages 47-54. ACM, 1992.

[PT12] Les Piegl and Wayne Tiller. The NURBS book. Springer Science & Business Media, 2012.

[Sam99] Jamshid A Samareh. A survey of shape parameterization techniques. In NASA Conference Publication, pages 333-344. Citeseer, 1999.

[SMN13] Jami J Shah, Martti Mantyla, and Dana S Nau. Advances in feature based manufacturing. Elsevier, 2013.

[SP86] Thomas W Sederberg and Scott R Parry. Free-form deformation of solid geometric models. In ACM SIGGRAPH computer graphics, volume 20, pages 151-160. ACM, 1986.

[SV95] Vadim Shapiro and Donald L Vossler. What is a parametric family of solids? In Proceedings of the third ACM symposium on Solid modeling and applications, pages 43-54. ACM, 1995.

[SY05] Wenhao Song and Xunnian Yang. Free-form deformation with weighted t-spline. The Visual Computer, 21(3):139-151, 2005.

What is claimed is:

1. A computer-implemented method for modifying a three-dimensional (3D) model in a shape editing system, comprising:
   (a) obtaining the 3D model in the shape editing system;
   (b) selecting one or more arbitrary first faces (S) of the 3D model;
   (c) identifying, based on the one or more arbitrary first faces (S) a set of one or more second faces (S') that are fixed, wherein the one or more arbitrary first faces do not overlap with the one or more second faces;
   (d) prescribing shape modification operations to be performed on the one or more arbitrary first faces (S);
   (e) constructing a deformation lattice by:
      (1) setting up a lattice structure with control points, wherein parametric space (u,v,w) is defined in terms of vertices of the lattice structure;
      (2) mapping Euclidean space (x,y,z) of the 3D model to the parametric space (u,v,w) of the lattice structure;
   (f) evaluating the deformation lattice by:
      (1A) when the shape modification operation to be performed on one or more of the arbitrary first faces comprises an affine transformation, applying the affine transformation directly on a set of the control points of the deformation lattice;
      (1B) when the shape modification operation to be performed on one or more of the arbitrary does not comprise an affine transformation, deforming the deformation lattice based on a discrete fitting problem; and
   (g) outputting a deformed 3D model based on the evaluated deformation lattice.

2. The computer-implemented method of claim 1, wherein the obtaining the 3D model comprises importing the 3D model from a different application.

3. The computer-implemented method of claim 1, wherein the obtaining the 3D model comprises acquiring a model from a model update after a prior deformation lattice based shape modification operation.

4. The computer-implemented method of claim 1, wherein the shape modification operation is selected from a group consisting of scaling, rotation, translation, and offset.

5. The computer-implemented method of claim 1, wherein the constructing the deformation lattice further comprises:
   refining the deformation lattice around the one or more arbitrary first faces (S) based on a characteristic of the one or more arbitrary first faces (S) and the prescribed shape modification operation.

6. The computer-implemented method of claim 1, wherein the mapping comprises:
   mapping an interior of a bounding box around the 3D model to a parallelepiped parametric space $0<u<1$, $0<v<1$, and $0<w<1$.

7. The computer-implemented method of claim 1, wherein:
   the deformation lattice structure comprises control points that are uniformly spaced.

8. The computer-implemented method of claim 1, wherein:
   additional control points are added to the deformation lattice structure based on the one or more arbitrary first faces (S) and the prescribed shape modification operations.

9. The computer-implemented method of claim 1, wherein a constraint mechanism is created in order to keep the one or more second faces (S') fixed and allow the one or more arbitrary first faces (S) to move, wherein the constraint mechanism uses distance functions defined using S and S'.

10. The computer-implemented method of claim 1, wherein the evaluating further comprises:
    applying a structural constraint to the deformation lattice, wherein the structural constraint comprises a stiffness along edges connecting two or more neighboring control points, wherein the edges and the two or more connected control points comprise a structural system; and
    when applying the shape modification operation to the deformation lattice, an energy of the structural system is minimized.

11. A computer-implemented system for modifying a three-dimensional (3D) model in a shape editing system, comprising:
    (a) a computer;
    (b) a shape editing system executing on the computer, wherein the shape editing system:
       (1) obtains the 3D model;
       (2) selects one or more arbitrary first faces (S) of the 3D model;
       (3) identifies based on the one or more arbitrary first faces (S), a set of one or more second faces (S') that are fixed, wherein the one or more arbitrary first faces do not overlap with the one or more second faces;
       (4) prescribes shape modification operations to be performed on the one or more arbitrary first faces (S);
       (5) constructs a deformation lattice by:
          (A) setting up a lattice structure with control points, wherein parametric space (u,v,w) is defined in terms of vertices of the lattice structure;
          (B) mapping Euclidean space (x,y,z) of the 3D model to the parametric space (u,v,w) of the lattice structure;
       (6) evaluates the deformation lattice by:
          (A(i)) when the shape modification operation to be performed on one or more of the arbitrary first faces comprises an affine transformation, applying the affine transformation directly on a set of the control points of the deformation lattice;
          (A(ii)) when the shape modification operation to be performed on one or more of the arbitrary first faces does not comprise an affine transformation, deforming the deformation lattice structure based on a discrete fitting problem; and (7) outputs a deformed 3D model based on the evaluated deformation lattice.

12. The computer-implemented system of claim 11, wherein the shape editing system obtains the 3D model by importing the 3D model from a different application.

13. The computer-implemented system of claim 11, wherein the shape editing system obtains the 3D model by acquiring a model from a model update after a prior deformation lattice based shape modification operation.

14. The computer-implemented system of claim 11, wherein the shape modification operation is selected from a group consisting of scaling, rotation, translation, and offset.

15. The computer-implemented system of claim 11, wherein the deformation lattice is constructed by:

refining the deformation lattice around the one or more arbitrary first faces (S) based on a characteristic of the one or more first faces (S) and the prescribed shape modification operation.

16. The computer-implemented system of claim 11, wherein the shape editing system maps by:

mapping an interior of a bounding box around the 3D model to a parallelepiped parametric space $0<u<1$, $0<v<1$, and $0<w<1$.

17. The computer-implemented system of claim 11, wherein the deformation lattice structure comprises control points that are uniformly spaced.

18. The computer-implemented system of claim 11, wherein the additional control points are added to the deformation lattice structure based on the one or more arbitrary first faces (S) and the prescribed shape modification operations.

19. The computer-implemented system of claim 11, wherein a constraint mechanism is created in order to keep the one or more second faces (S') fixed and allow the one or more arbitrary first faces (S) to move, wherein the constraint mechanism uses distance functions defined using S and S'.

20. The computer-implemented system of claim 11, wherein the shape editing system evaluates by:

applying a structural constraint to the deformation lattice, wherein the structural constraint comprises a stiffness along edges connecting two or more neighboring control points, wherein the edges and the two or more connected control points comprise a structural system; and when applying the shape modification operation to the deformation lattice, an energy of the structural system is minimized.

* * * * *